(No Model.)  
J. PRICE.  
BALING PRESS.  
2 Sheets—Sheet 1.
No. 409,335. Patented Aug. 20, 1889.
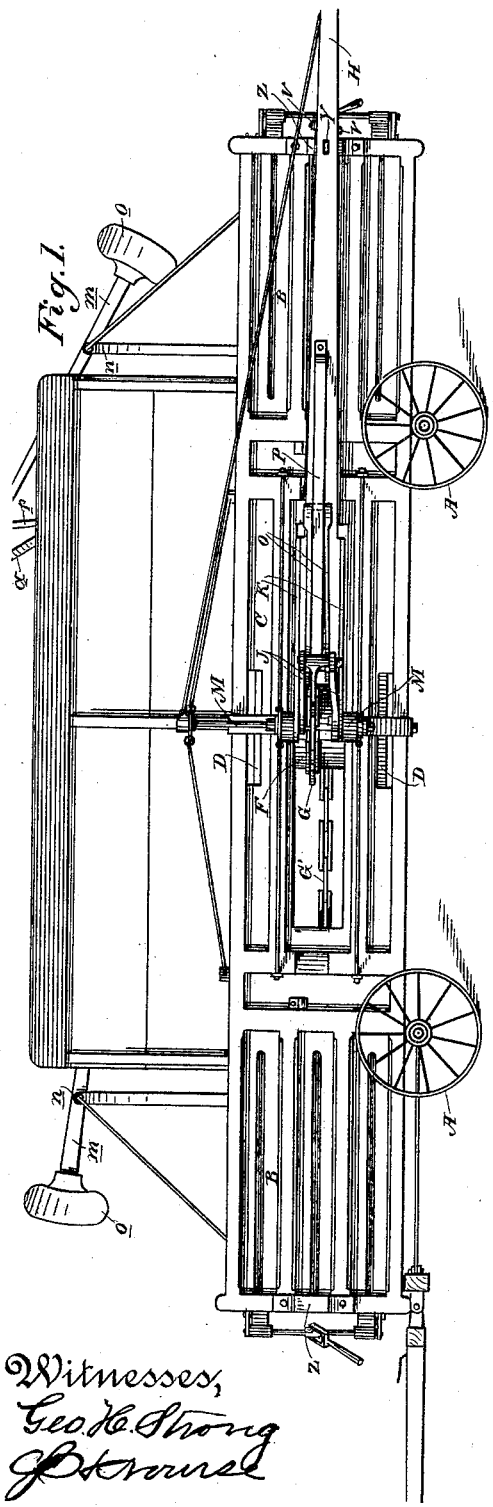
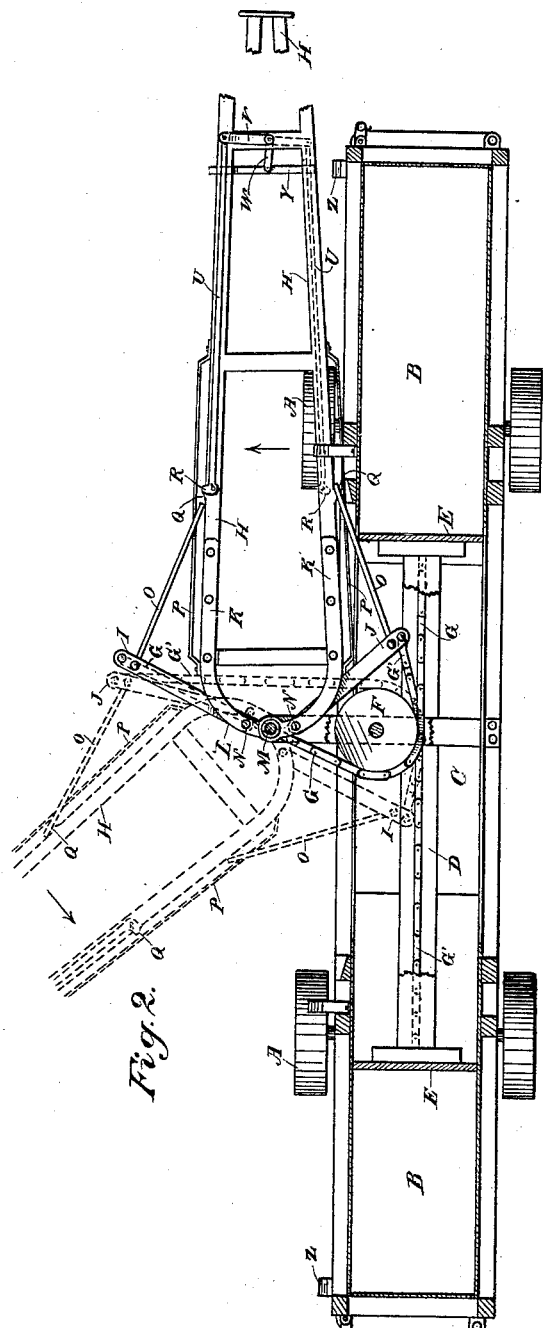
Witnesses,  
Geo. H. Strong  
Inventor,  
Jacob Price  
By Dewey & Co.  
attys (No Model.) 2 Sheets—Sheet 2.
J. PRICE.
BALING PRESS.
No. 409,335. Patented Aug. 20, 1889.
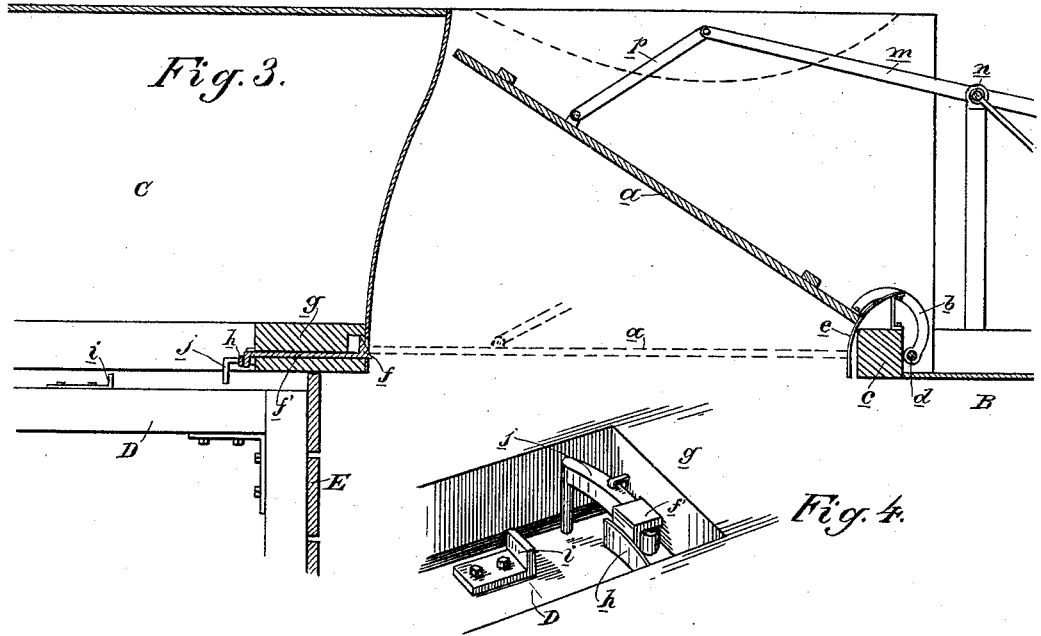
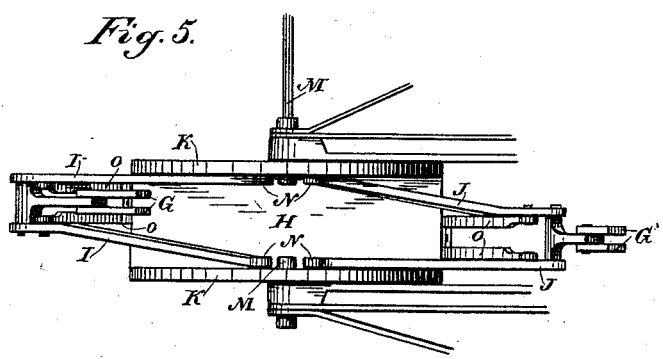
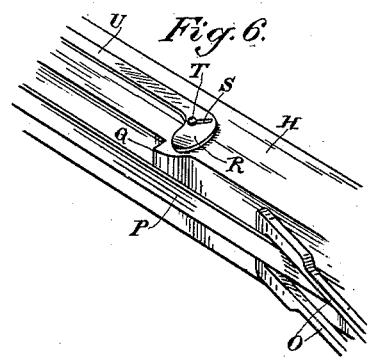
Witnesses,
Geo. H. Strong.
Inventor,
Jacob Price
By Dewey & Co
Attys

UNITED STATES PATENT OFFICE.

JACOB PRICE, OF SAN LEANDRO, CALIFORNIA.

BALING-PRESS.

SPECIFICATION forming part of Letters Patent No. 409,335, dated August 20, 1889.

Application filed December 28, 1888. Serial No. 294,869. (No model.)

*To all whom it may concern:*

Be it known that I, JACOB PRICE, of San Leandro, Alameda county, State of California, have invented an Improvement in Baling-Presses; and I hereby declare the following to be a full, clear, and exact description of the same.

My invention relates to improvements in baling-presses; and it consists of the constructions and combinations of devices which I shall hereinafter fully describe and claim.

Figure 1 is a side elevation of the press. Fig. 2 is a horizontal plan showing the baling-chamber in section and the sweep or power lever with its connections to the double-headed follower. Fig. 3 is an enlarged detail showing the feed-door and its hinge and latch. Fig. 4 shows a mechanism for unlatching and releasing the feed-door. Fig. 5 is a rear end view of the power-lever, showing the relative positions of the chains and the intermediate connecting-levers. Fig. 6 is a detail showing in perspective one of the catches upon the side of the power-lever, the guide extending along the lever and the end of the yoke which slides upon the guide and engages with the catch.

The body of the baling-press is mounted upon wheels A A for convenience in transporting; and it consists of two baling-chambers B B, separated by an intermediate space C, within which the follower-beam D lies. At each end of this beam is fixed the stout follower E, and this intermediate space is long enough to allow one of the followers to be moved toward the center, while the other one is forced outward to compress the material in its chamber, after which the operation is reversed and the two followers are moved in the opposite direction, the bales being pressed consecutively and not simultaneously, the intermediate space allowing of these movements without interfering with the mechanism contained therein by which the followers are actuated. This consists of a strong pulley or drum F, journaled in the center longitudinally of the machine upon a vertical axis. Around this drum two chains G and G' pass, one of them being connected with one of the followers and the other with the opposite one. These chains are so connected with the power-lever H that when this lever is moved around its fulcrum to one side it draws upon one of the chains, and this draws the follower-beam and the two followers in a straight line by reason of the chain passing around the pulley F. The power thus applied draws the follower to which this chain is attached toward the center and forces the other one outwardly at the same time to compress the material within its baling-chamber B. The reverse movement of the power-lever H causes an opposite movement of the followers.

It will be seen that the chains are centrally connected to the followers, and the drum F is so journaled that its periphery is just in line between the points of attachment of the two chains, so that they touch it at a tangent with its surface. By reason of this construction the pull upon the chains will always be in a direct central line and the followers will not be forced against one side or the other of the press, as is the case when lever-connections are used in place of the chains.

In order to alternately connect the chains with the power-lever H and disconnect one while the other is operating, and also to progressively increase the power, I employ the intermediate levers I and J. The power-lever H is built, as shown in the drawings, so as to have considerable strength, and at the rear ends are the stout iron bands K, which are bolted securely along the sides of the top and bottom of the lever, being curved in a semicircle, as shown at L, so as to extend behind the square rear end of the lever.

The lever H is moved around in a horizontal plane by means of a team attached to its outer end and traveling in a semicircle. The rear end of the lever is journaled upon the shafts M, one of which extends upward from the upper band K, and the other extends downward from the lower band K, as shown in Fig. 5, so that the space between the two is left open to allow the chains to pass across this space behind the lever and between the upper and lower bands K when the machine is in operation. The intermediate levers I and J are fulcrumed between the bands K K at points N on either side of the fulcrum-shafts M. To the ends of each of these levers I and J are pivoted links O. These links extend from the fulcrum-pins to the sides of the lever H, and the bight or yoke portion of which is formed by the curve between the upper and lower parts of each of the links clasps an elastic guide-rod P, which is secured to the side of the lever H, as shown in Figs. 1 and 6.

Upon each side of the lever H is formed a projecting catch Q, and when the links O slide along between the guide and the lever to a certain point they will engage with the catches Q. The object of this is plainly shown in Fig. 2, where the lever H is parallel with the right end of the press. The link O at the side nearest the press of the lever is engaged with its catch Q, while the other end is attached to the lever J and in nearly a direct line with the chain G', which extends from the end of the lever across the periphery of the pulley F, and thence in a straight line to the follower E at the left end, where it is strongly attached, as above described.

It will be seen that when the team is started, so as to move the lever H in a semicircle in the direction of the arrows, Fig. 2, around its fulcrum-shafts M, the catch Q acts upon the link O, and this, pulling on the lever J, draws the chain G' and through it the follower-beam, thus forcing the follower at the right hand of the press into the baling-chamber, so as to compress its contents. At the same time the link O upon the opposite or upper side of the lever H has been released from its catch, so that the lever I and the opposite chain G are free to move without any especial strain upon them, and as the lever H continues its movements to the position shown in dotted lines the drag upon the chain and the lever I will have drawn the link O nearly to the rear end of the guide P. As the movement continues, the back of the lever I strikes against the pulley F, which arrests it, and the link O then slides up the guide P until just as the lever H reaches its point of rest at the left side of the press this link will have engaged the catch Q upon that side, while the other link O will be released simultaneously. This release takes place as follows: Upon each side of the lever H are two plates R, (plainly shown in Fig. 6,) having diagonal slots S made in them, which fit over pins T, fixed in the lever H. These plates R have rods U extending from them along the lever H and connecting with the opposite ends of the T-lever V, which is fulcrumed at a point some distance away from the pivoted end of the lever H. One of the plates R is above the lever H and the other one is below it, as shown in the dotted lines in Fig. 2. The lever V is similarly formed with one of its arms above the lever H and the other below it, so that they may be connected with the rods U. The arm W of the lever V extends at right angles to the other two arms, and is pivoted to a bar Y, which slides in guides across the width of the lever H. This bar Y is slightly longer than the width of the lever H, and upon each end of the press is fixed a stop Z, so that when the lever has reached the end of its travel in either direction the projecting end of the bar Y will strike the stop Z, and thus force the bar to travel across the level, and by its action upon the T-lever V W the latter will be moved so as to move the rod U and the plates R. These plates being slotted diagonally, as shown at S, Fig. 6, the movement will throw the points of the plates either outwardly or inwardly. When thrown outwardly, they slide over the catches Q, so as to force the link which is connected with the catch at that time out of engagement with the catch, while upon the opposite side or the one nearest to the press the plate R is withdrawn, so as to leave the catch Q exposed in readiness for the link O on that side to engage it. By this construction the levers I and J are alternately connected with and disconnected from the power-lever H, the operation being automatic, so that one lever is exercising its power to pull on one of the chains and draw the follower in one direction, while the other is loose during this movement; but at the end of the movement the positions of the two are reversed and the other one commences to draw the follower when the lever H is moved in the opposite direction.

In order to give all possible space for the movement of the feed-door a, Fig. 3, to admit as large a quantity as possible of the material to be pressed, the rear end is secured to semicircular hinges b, which extend around and behind the timber c of the frame and are pivoted or hinged at the point d. e is a plate over which the rear edge of the door moves when it is opened or closed. It will be seen by this construction that when the door a is opened, instead of turning about a hinge close to its rear edge, it turns about a point d at a considerable distance from the rear edge, and this allows it to be raised up and carried entirely clear of the opening, so that a considerable quantity more of the material may be introduced before the door is closed, and when the door is closed it forces this material into the press. The door a when closed is engaged and held in place by the latch f, which has a shank f' extending through the timber g, as shown in Figs. 3 and 4. A spring h presses upon the rear end of the shank f', and this keeps the latch forced forward in readiness to engage the edge of the door a when it closes. In order to disengage the latch from the door and allow it to open when the follower has been drawn back sufficiently to allow the chamber to receive the charge, a lug i upon the follower engages the lever j, and thus acts upon the shank f', as shown more plainly in Figs. 3 and 4, so as to withdraw the latch f and allow the door to be opened. The feed-doors a are opened automatically by means of levers m, fulcrumed in posts n above and behind the hinged edges of the doors, as shown. Upon the outer ends of these levers are fixed weights o, which when the doors are released will raise them automatically. The doors, however, exercise the greatest resistance or weight when lying down or closed. In addition to this, the doors are apt to stick and not open freely. In order to overcome this difficulty and increase the power of the lever and weight at the moment of starting, the end of the lever $m$ adjacent to the top of the door is jointed to another short lever $p$, which has its opposite end jointed to the top of the door, as shown in Fig. 3. When the doors are closed, the two levers $m$ and $p$ are in a straight line with each other, and extend at an incline from the top of the fulcrum-post $n$ to the point of attachment on the door. When the latter is released from its fastenings, the weight acts upon the levers and bends the joint where they unite. This action is that of a knee or toggle-joint reversed, and exercises great power to start the door from its seat. The first part of the movement is slow and the leverage powerful. Then as the lever $m$ approaches a horizontal position the weight is thrown farther from the fulcrum, and as the door approaches a vertical position the resistance is lessened. At the same time the joint between the levers again binds and gives a more rapid motion to the door in proportion to the movement of the lever $m$ and weight. These jointed levers also serve as stops for the door when it is closed. It is objectionable to place projecting stops or ledges for the doors to rest upon when closed, as these would become fouled with the hay. The jointed levers, extending in a straight line from the tops of the fulcrum-posts to the points of attachment upon the doors, serve this purpose, and thus leave the sides of the wells or openings free from obstructions. The completed bales are discharged at each end of the press.

Having thus described my invention, what I claim as new, and desire to secure by Letters Patent, is—

1. A horizontal press with baling-chambers at opposite ends, followers fitting said chambers, and an intermediate connecting-beam, in combination with chains attached to the beam or followers, a direction drum or pulley around which the chains pass, a sweep or power lever fulcrumed at the side of the press, supplemental levers fulcrumed at the inner end of the sweep and having points of attachment for the outer ends of the chains, and links connecting the outer ends of said levers with the sides of the sweep, substantially as described.

2. A horizontal baling-press with end chambers and followers, chains, guide-drum, sweep, and supplemental levers, to which the outer ends of the chains are connected, as shown, in combination with the links O, guides P, and the catches Q upon the sides of the sweep to engage the link, substantially as herein described.

3. The sweep fulcrumed at the side of the press and having the supplemental levers fulcrumed to and projecting from the rear end, links extending from the outer ends of these levers to the sides of the sweep, guides upon which the ends of the links travel along the sweep, and catches Q, with which they engage, in combination with the angularly-slotted detaching-plates R, connecting-rods U, and the oscillating lever by which they are simultaneously reversed, substantially as herein described.

4. In a baling-press, the combination of the horizontally-closing feed-door having the curved hinges, the pintles of which are fixed at a distance from the edge of the door-opening, the curved guide-plate against which the rear edge of the door travels when opening or closing, and a support for the hinge-pintle and guides, substantially as herein described.

5. In a baling-press, the horizontally-closing feed-door, the holding-latch, with the shank sliding through the frame-timbers, the lever $j$, and the holding-spring, in combination with the plate $i$, actuated by the movement of the follower, so as to withdraw the latch and release the door, substantially as herein described.

In witness whereof I have hereunto set my hand.

JACOB PRICE.

Witnesses:
   S. H. NOURSE,
   H. C. LEE.